United States Patent
Medran-Lopez (10) Patent No.: US 8,834,754 B2
(45) Date of Patent: Sep. 16, 2014

(54) MANUFACTURING PROCESS OF COMPACT MONOLITHIC PRISMATIC MODULES FOR CONSTRUCTION

(76) Inventor: Francisco Medran-Lopez, Dos Torres (ES)

(*) Notice: Subject to any disclaimer, the term of this patent is extended or adjusted under 35 U.S.C. 154(b) by 0 days.

(21) Appl. No.: 13/701,092

(22) PCT Filed: Aug. 25, 2010

(86) PCT No.: PCT/ES2010/000306
§ 371 (c)(1),
(2), (4) Date: Apr. 8, 2013

(87) PCT Pub. No.: WO2011/151475
PCT Pub. Date: Dec. 8, 2011

(65) Prior Publication Data
US 2013/0205709 A1  Aug. 15, 2013

(30) Foreign Application Priority Data

May 30, 2010 (ES) .................... 201000706

(51) Int. Cl.
*E04G 21/02* (2006.01)
*B28B 1/14* (2006.01)
(Continued)

(52) U.S. Cl.
CPC . *E04G 21/02* (2013.01); *B28B 1/14* (2013.01); *B28B 1/30* (2013.01); *B29C 39/123* (2013.01); *E04G 11/02* (2013.01); *B28B 7/186* (2013.01); *B28B 7/22* (2013.01); *B28B 7/24* (2013.01); *B28B 23/0025* (2013.01); *B28B 23/0068* (2013.01); *B28B 23/02* (2013.01)
USPC ............. 264/35; 264/250; 264/275; 264/279; 264/279.1; 52/745.13; 249/27; 249/83

(58) Field of Classification Search
CPC ........... E04G 11/02; E04G 21/02; B23B 1/14; B23B 1/30; B23B 7/18; B23B 7/186; B23B 7/22; B23B 7/24; B23B 23/00; B23B 23/0025; B23B 23/0068; B23B 23/02; B23B 23/16; B29C 39/10; B29C 39/12; B29C 39/123; B29C 41/20; B29C 41/22
USPC ........ 264/275, 271.1, 259, 35, 241, 250, 253, 264/279, 279.1; 249/27, 83; 52/745.13, 52/745.05, 745.06, 745.08, 745.09, 745.1
See application file for complete search history.

(56) References Cited

U.S. PATENT DOCUMENTS 3,652,052 A * 3/1972 Van Der Lely ................. 249/27
3,884,613 A * 5/1975 van der Lely ................. 425/404
(Continued)

FOREIGN PATENT DOCUMENTS

BE   904448 A1   7/1986
EP   0650812 A1  5/1995
(Continued)

*Primary Examiner* — Michael Safavi
(74) *Attorney, Agent, or Firm* — Porzio, Bromberg & Newman, P.C.

(57) ABSTRACT

The object of the invention is to obtain prefabricated modules of reinforced concrete corresponding to a dwelling with or without compartments, with its six wall structures consisting of single elements, achieving in this way a 100% monolithic structure, which eliminates any vibrations or dilatation and prevents the formation of cracks or humidity in the module. To this end, an internal permanent formwork is manufactured in the plant on the basis of six elements—floor, walls and ceiling, which are fixed along their edges by means of high-resistance putty and provided with distancing pads (9) on the bottom base on the floor or on the selected supporting surface with the service installations (11) mounted on the external face of the permanent formwork (1, 2, 3, 4, 5 and 6) and over them the insulation material (12), where it is necessary, then a structural frame (13), and finally an external recoverable formwork (14).

3 Claims, 6 Drawing Sheets

(51) Int. Cl.
  *B28B 1/30* (2006.01)
  *B29C 39/12* (2006.01)
  *E04G 11/02* (2006.01)
  *B28B 7/18* (2006.01)
  *B28B 7/22* (2006.01)
  *B28B 7/24* (2006.01)
  *B28B 23/00* (2006.01)
  *B28B 23/02* (2006.01)

(56) References Cited

U.S. PATENT DOCUMENTS

| | | | |
|---|---|---|---|
| 4,107,886 A * | 8/1978 | Ray et al. | 52/79.11 |
| 4,180,233 A * | 12/1979 | Johnson | 249/144 |
| 4,252,292 A * | 2/1981 | Armas | 249/27 |
| 4,272,050 A * | 6/1981 | del Valle | 249/144 |
| 4,432,171 A * | 2/1984 | Boot | 52/79.1 |
| 4,495,131 A * | 1/1985 | Del Valle | 264/256 |
| 4,519,568 A * | 5/1985 | Day et al. | 249/66.1 |
| 4,799,982 A * | 1/1989 | Vicino | 156/71 |
| 5,755,982 A * | 5/1998 | Strickland et al. | 249/74 |
| 7,337,591 B2 * | 3/2008 | Molina | 53/426 |
| 8,048,346 B2 * | 11/2011 | Murphy | 264/31 |
| 2007/0095006 A1 | 5/2007 | Konersmann | |

FOREIGN PATENT DOCUMENTS

| | | |
|---|---|---|
| FR | 2244064 A1 | 4/1975 |
| WO | 2009112037 A1 | 9/2009 |

\* cited by examiner

MANUFACTURING PROCESS OF COMPACT MONOLITHIC PRISMATIC MODULES FOR CONSTRUCTION

CROSS REFERENCE TO RELATED APPLICATION

This is a National Stage of International Application No. PCT/ES2010/000306, filed 25 Aug. 2010, which claims the benefit of Application No. P201000706, filed in Spain on 31 May 2010, the disclosures of which Applications are incorporated by reference herein.

OBJECT OF THE INVENTION

This invention relates to a new procedure for the manufacture of compact blocks, i.e. blocks formed by a cubicle to be used on their own or in combination with other similar blocks, in erecting a building of variable height.

The objective of the invention is to achieve 100% monolithic prismatic modules that do not require rigid floor fixing and that nullify any vibration or expansion, preventing the appearance of cracks and humidity; all at a surprisingly low cost and suitable for mass-production in its entirety.

Thus, the invention lies within the field of construction.

BACKGROUND OF THE INVENTION

Old, obsolete and costly construction processes for buildings based on a concrete foundation upon which stands a structure formed by columns and beams, enclosed at the top by a slab and laterally by bricks and other similar construction materials, are increasingly being replaced with pre-fabricated modules, usually made of reinforced concrete, which form prismatic-rectangular blocks with respective openings for doors, windows, etc., so that each module consists of reinforced concrete panels corresponding to each of its sides, factory-made, installable on the ground, specifically over an appropriate foundation, joined together at their edges usually with the help of mechanical means, such as screws, nuts or other things.

This multiple-part construction of the modules, as well as their attachment to the foundation, is inherently prone to expansion and vibrations, whereby cracks and humidity frequently appear on the modules.

Furthermore, this structuring does not preclude the need for subsequent coatings both internally and externally, as well as chamber formation for the passage of service ducts and for the introduction or spreading of insulation materials correspondingly to external wall surfaces.

In an attempt to overcome these problems, there are some known solutions wherein two, three, four or five sides of the prismatic block are joined together at their origin as a single piece, i.e. reducing the number of pieces forming the module and consequently the number of joints put between them.

This is the case with the invention patent EP0650812, in which the process for obtaining a module for construction is described. This includes a construction phase in the factory of an internal permanent formwork based on at least six constituent elements, consisting of a bottom base, a top base and four lateral walls, after which, the mounting of the integral elements of the said permanent formwork is carried out. This involves configuring a rectangular prismatic block, supporting the said rectangular prismatic block directly on the ground or on a horizontal platform, and subsequently adding an external formwork to the formwork described above, proceeding thereafter to fill the perimetral space existing between the two formworks with highly-fluid self-compacting concrete, so that in this last phase, after having the concrete has hardened, the external and recoverable formwork is removed, thereby achieving the module.

With this solution, the first problem described is partially solved while the second remains completely unresolved.

The inventor is not aware of the existence of any other solutions in industry or on the site of construction to achieve a completely monolithic state, i.e. where all six sides of the prismatic block are joined together as a single piece to provide the benefits listed above.

Description of the Invention

The manufacturing process of compact modules for use in construction proposed by the invention achieves this complete monolithic state, as mentioned above, as well as much lower manufacturing costs in comparison with any of the conventional construction systems.

More specifically, to achieve this, the process begins with a factory-made permanent formwork, which integrates all the lateral sides as well as the upper and lower slabs, corresponding to the inside of the desired prismatic cubicle space. This permanent formwork integrates both the cubicle's internal finishing materials and the appropriate hollows for doors, windows, etc., as well as orthogonal partitioning walls corresponding to these hollows, and with a width consistent with the thickness for the internal or external wall as a whole.

Once these are hardened, the dimensions of which are restricted only by logical transportation limits, the formworks are stored within the factory itself, or where deemed most appropriate, until the time for their use.

At that time, the geometry of the module to be built is traced on the floor over a plated smooth simple platform, which may even be a properly compacted floor. This can be done in the factory or on the building-site.

The lower slab is provided on top of this platform in the appropriate position, with the assistance of supports that sufficiently separate the slab from the platform, according to the forecast total thickness of the lower slab.

We then proceed to provide the necessary walls comprising each module, which could simply consist of the perimetral walls, or one or several of the internal compartment partition walls, thus also holding on to the lower slab by means of high strength putty, and finally proceeding to place the upper slab.

Furthermore, all necessary installations are placed on the external side of this internal integral formwork, such as electricity, telephone, sanitation, drinking water, etc.

Subsequently and above these installations, i.e. externally to them, insulation is either placed or spread over those wall surfaces that require it.

Next, a surrounding reinforcement is provided, which affects all six sides of the formwork and is calculated according to the required strength.

Next, an external formwork is put in place. This is made of four lateral pieces, each substantially protruding over the adjacent piece at one of its edges, so that this external formwork can allow for slabs and walls of any size, by simply joining together the four overlapping lateral sides.

At the next operational phase, we proceed to fill the space between internal permanent formwork and the external recoverable formwork, with highly-fluid self-compacting concrete of high initial and final strengths, to prevent segregation at the pouring stage and thereby obtaining a 100% monolithic state, the concrete pouring achieving the highest forecast level for the upper slab, i.e. a hollow rectangular prismatic block is obtained, made of reinforced concrete and a single-piece structure, whereby the module does not require rigid floor fixing and prevents any risk of vibration or expansion that could cause the appearance of cracks and humidity within the module.

After stripping the module, i.e. after removal of the external and recoverable formwork, the structural behaviour of the module is identical to that of a beam, providing sufficient stability and strength for use at one level, or for piling in stacks of ten, twelve, or even more, depending on the thickness of its walls, by joining together the modules with the corresponding anchors for both vertical and horizontal handling.

All of this, in unison, achieves not only excellent quality, but also a much lower manufacturing cost than previously conceived, owing to the system's simplicity, while providing very high versatility for any industry, whether through automation or simply by mechanisation, being affordable for all investors, regardless of their location or financial ability, and with the consequent development of industrial production of decent, safe and affordable housing for any given situation, besides remaining open to a plethora of possibilities with respect to quality, given its adaptation to different finishes of and installations to the internal and permanent formwork.

DESCRIPTION OF THE DRAWINGS

In order to supplement the description provided and with the purpose of better explaining the characteristics of the invention, the following preferred embodiment of the invention is given as an example only, without being limitative in any way, by reference to the accompanying drawings, in which.

PREFERRED EMBODIMENT OF THE INVENTION

Figure 1:
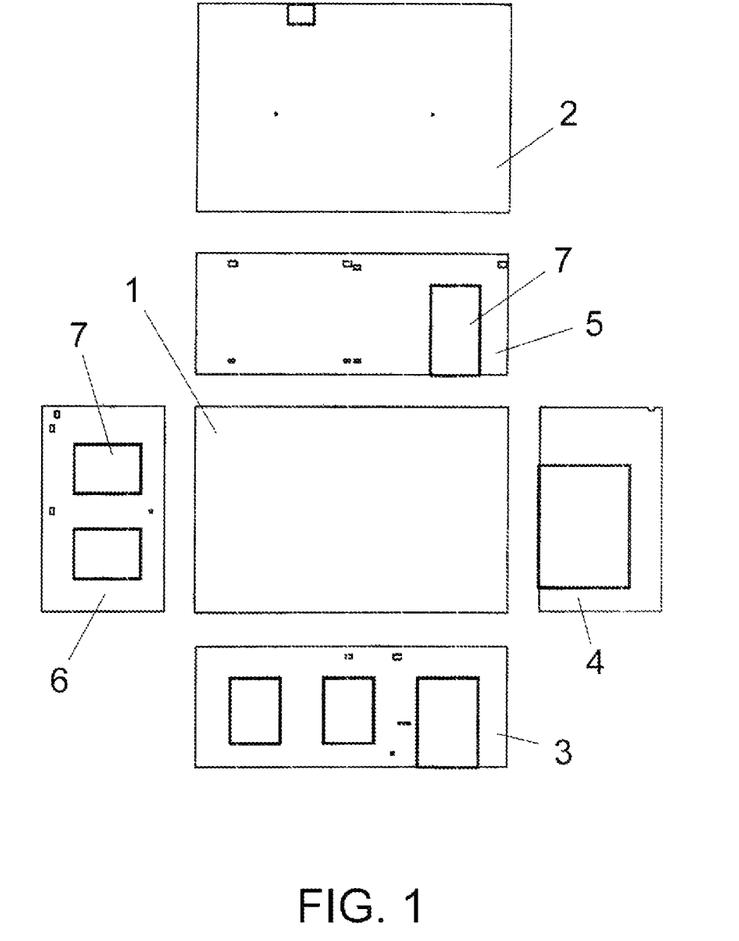
FIG. 1 shows a disassembled representation in the factory of the result obtained in the first phase of the procedure, i.e. the six integral parts of the internal permanent formwork.
Figure 2:
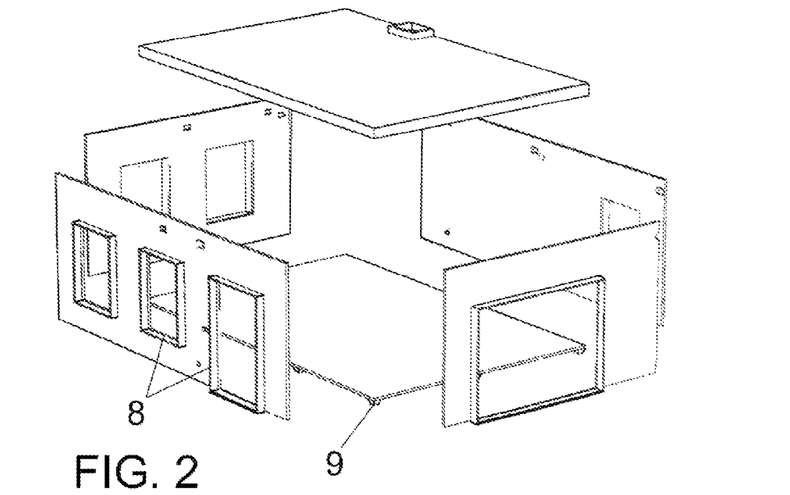
FIGS. 2 and 3 show the respective disassembled representation in the perspective of the structure presented in the preceding drawing but with the different parts exploded in their definitive position in relation to the assembly.
Figure 3:
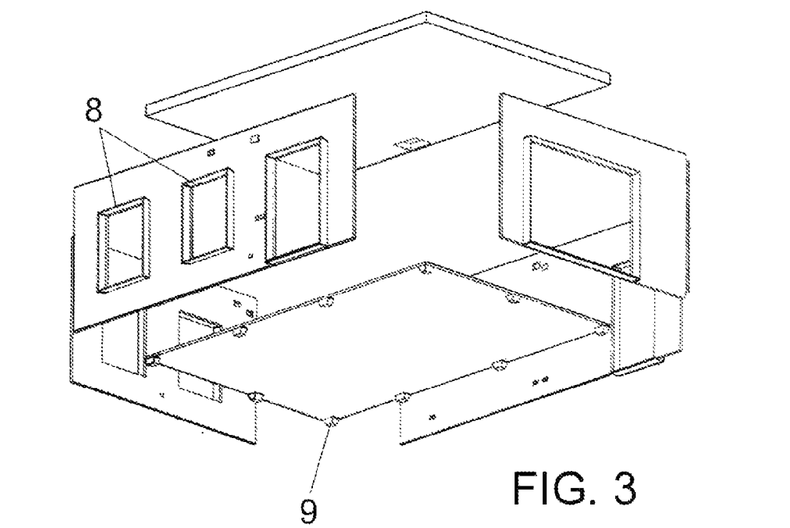

After observing the reviewed figures, and in particular FIGS. 1, 2 and 3, it can be seen how in the first phase of the procedure, at a factory level, the constituent parts of the internal permanent formwork are obtained, namely a base element (1) corresponding to the floor structure, a similar element (2) for the ceiling structure, and in this case four elements (3, 4, 5 and 6) corresponding to the lateral walls of the module, which optionally can be complemented with internal compartment elements not represented in the drawings.

These elements, in particular the lateral elements (3, 4, 5 and 6), incorporate openings (7) corresponding formally and dimensionally to doors and windows having external perimetric extensions, with dimensions coinciding with the planned thickness of the walls.

As was mentioned before, this permanent formwork (1, 3, 4, 5 and 6) is structured in such a way so that its internal face constitutes the final internal face as seen in the structure of the module.

Figure 4:
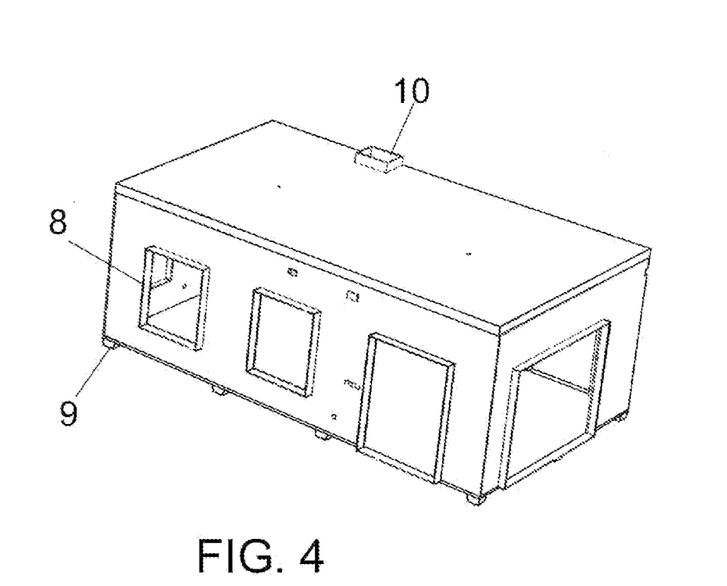
FIG. 4 shows the structure of the preceding figures duly assembled, i.e. the completely finished internal permanent formwork.

In the next operative phase, the fixing of these elements is proceeded with and, in order to implement the rectangular prismatic block of six faces shown in FIG. 4, as was pointed out above, high-resistance putty can be used for this purpose, to support the final concrete structure, although obviously also other adequate means of fixation can be used.

Going back again to the bottom platform (1), it must be pointed out that it incorporates in its bottom face buffers (9) depending on the distancing elements at the level of the permanent formwork in its entirety with respect to the floor and with respect to a platform that had been previously established in it. For its part, the element (2) corresponding to the ceiling structure can be provided, for example, with a rectangular window (10) for the exit of smoke or for some other purpose, extended into an ascending collar with the same height as the one planned for the said ceiling structure.

Figure 5:
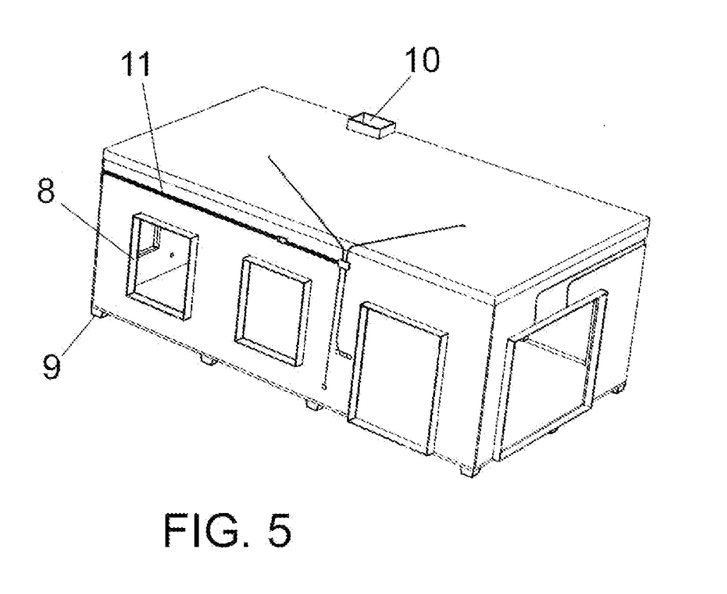
FIG. 5 shows a representation similar to that of the preceding figure, but where the service installations have been added to the internal permanent formwork.

After obtaining the internal permanent formwork, fixing externally to the same of the service installations of the module is proceeded with, such as, for example, in the present case and as shown in FIG. 5, the electrical installation (11).

Figure 6:
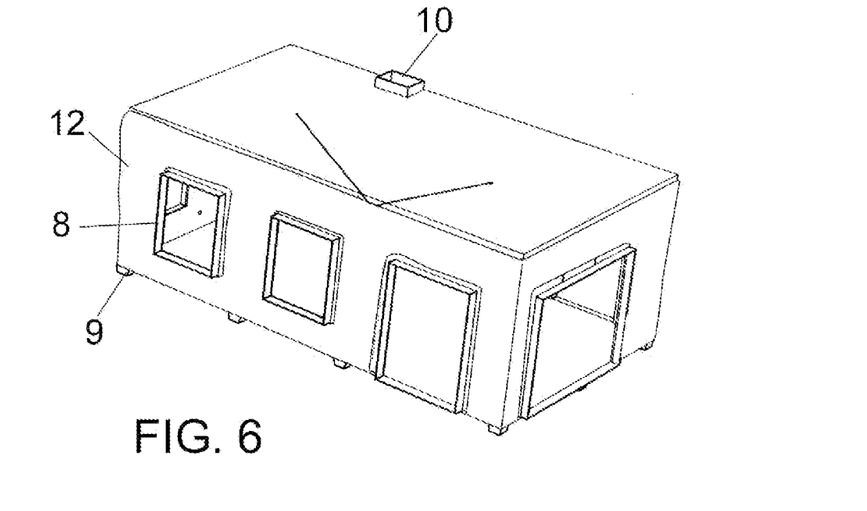
FIG. 6 shows the next operative phase of the procedure when the insulation material has been deposited on the structure shown in FIG. 5.

In a next operative phase, as shown in FIG. 6 and also externally, depositing the insulating material (12) on those faces of the formwork follows next, insofar as is necessary, namely that corresponding to the exterior of the dwelling.

Figure 7:
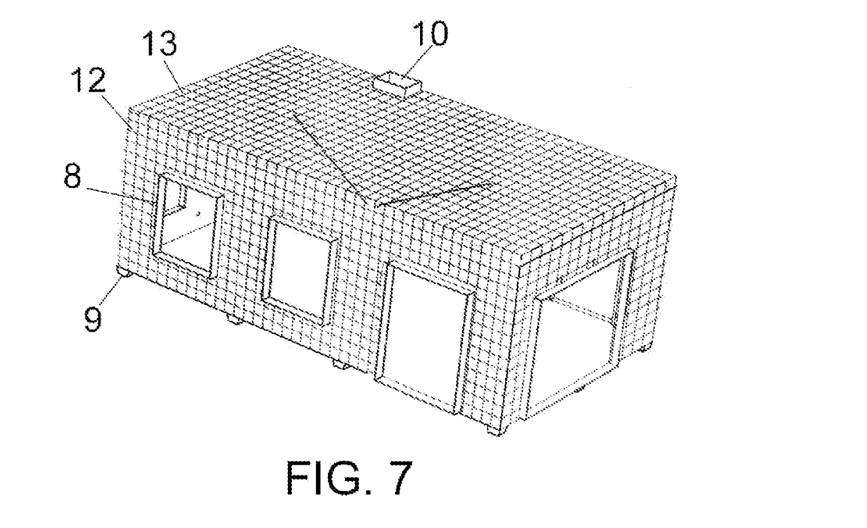
FIG. 7 shows the result of the next operative phase of the procedure in which the structure from FIG. 6 appears covered with a mesh framework.

Next establishing a framework over the entire perimeter of the structure shown in FIG. 6 is proceeded with, a framework (13) adequately calculated, based on a steel rack with not a very large cross section but sufficient to achieve the normally required objectives with a diameter for the same of eight millimeters.

Figure 8:
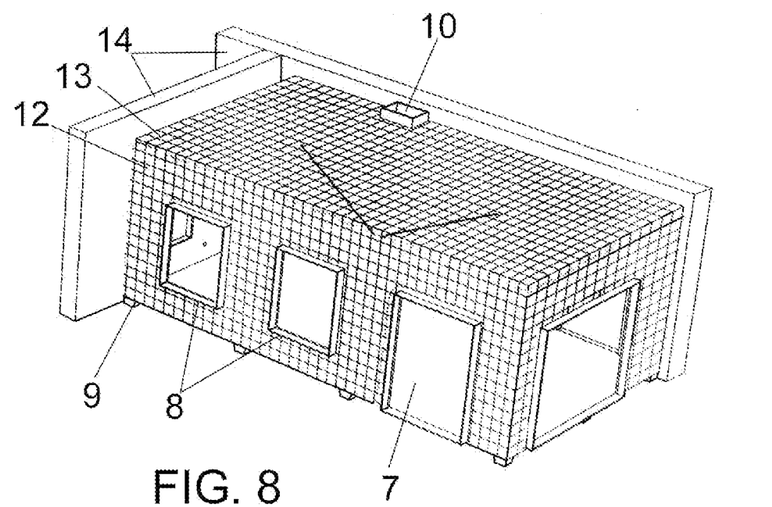
FIG. 8 shows the structure of the preceding figure in the intermediate phase of installation of the exterior recyclable formwork.
Figure 9:
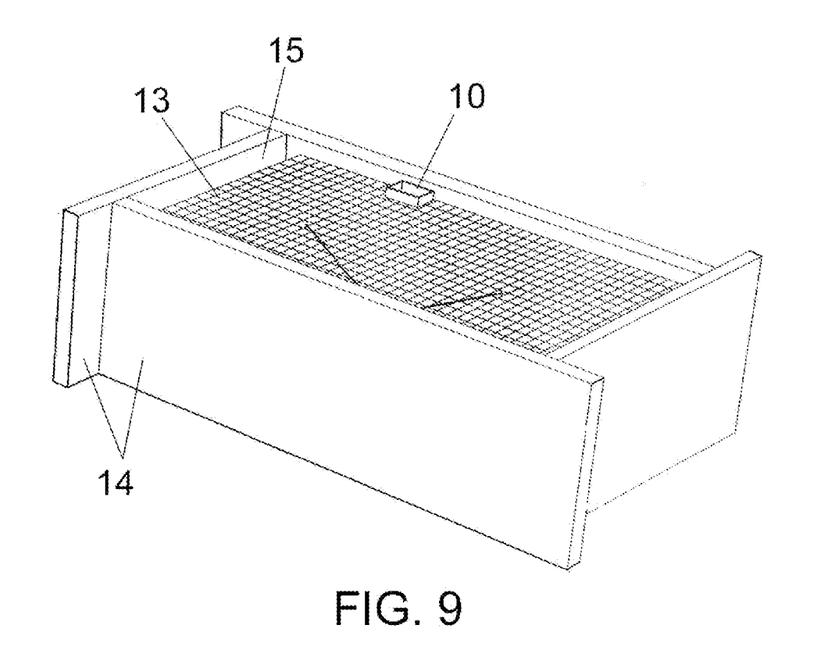
FIG. 9 shows the result after the complete implantation of the external formwork.

Next and as shown in FIGS. 8 and 9, an external recyclable formwork is mounted over the structure from the preceding figure, consisting of four vertical elements (14), each one of which is overlapping one of the vertical edges of the adjacent one, i.e. each of the elements of the formwork (14) is sticking out substantially with one of its ends with respect to the one it overlaps, which permits a change in the relative position between these four elements of the formwork (14) permitting in turn to vary as desired the distance between the exterior recyclable formwork and the internal permanent formwork, or—which is the same—the possibility to adjust as desired the thickness of the walls of the dwelling, whereas the height of the elements of the external formwork is considerably larger than the height of the internal formwork, including the buffers (9) of the latter in order to attain the desired width without anything more than filling with concrete up to the appropriate level.

Figure 10:
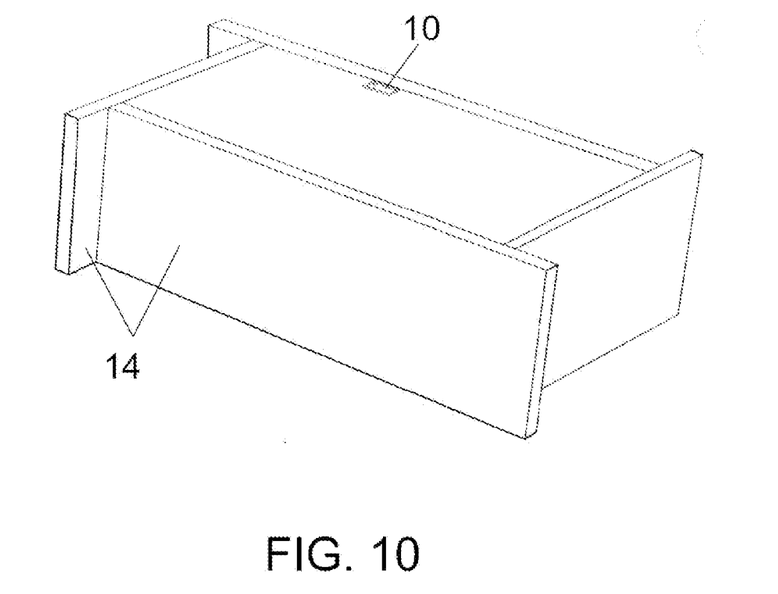
FIG. 10 shows the structure of FIG. 9 at the end of the phase of filling up with concrete of the space between the two formworks—external and internal.

After mounting the external formwork (14), it defines, along with the internal formwork and its accessories, a perimetric chamber (15) communicating directly with the one defined by the buffers (9) between them and the girder, which is filled with cement, as was pointed out above, and which exceeds with respect to the lower face of the formwork by an amount that is adequate to forming—also with the character of a single element—the ceiling structure of the module.

Figure 11:
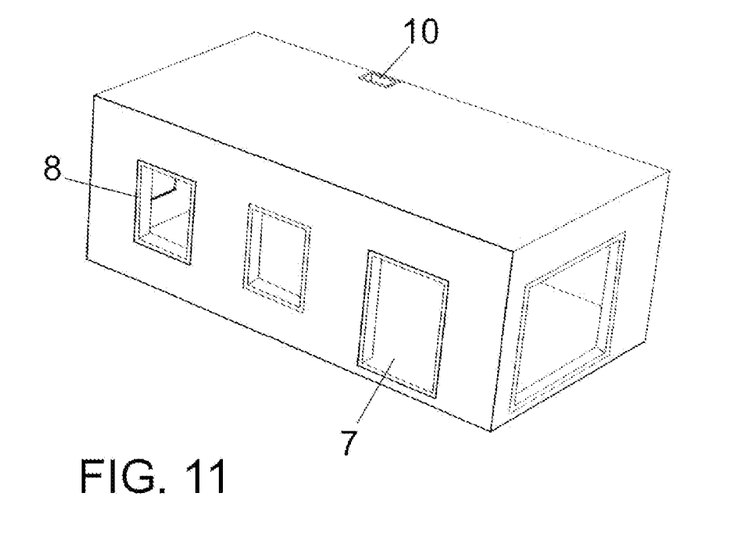
FIG. 11 shows, finally, the end result of the procedure after the removal of the external recoverable formwork.

The module concludes with the removal of the recyclable external formwork (14), with the module receiving the configuration represented in FIG. 11 or any other that is considered convenient as regards the number, the configuration and the location of the openings for doors and windows.

The invention claimed is:

1. A procedure for manufacturing of a rectangular prismatic module of reinforced concrete comprising the steps of:
   (a) mounting integral elements of a permanent formwork to form a rectangular prismatic block, the integral elements including a bottom base, a top base, and four lateral walls, said integral elements having openings corresponding to doors and windows;
   (b) supporting the prismatic block directly on the ground or on a horizontal platform;
   (c) adding an external formwork to the permanent formwork;
   (d) filling a perimetral space between the permanent formwork and the external formwork with fluid self-compacting concrete; and
   (e) removing the external formwork after the concrete has hardened,
   wherein in step (a) said integral elements are fixed to each other with high-resistance putty,
   wherein in step (b) the prismatic block is supported directly on the ground or on the horizontal platform with supporting elements positioned on the bottom of the bottom base and thereafter installing on an outside face of the permanent formwork necessary electrical, telephone, drainage, plumbing or other installations and subsequently placing or depositing insulating material on the outside of the permanent formwork on an external surface of the lateral walls that require it and wherein the external formwork comprises four lateral pieces, each of the lateral pieces substantially protruding over an adjacent lateral piece of the external formwork and a lateral wall of the permanent formwork, so that a distance between the external formwork and permanent formwork can be regulated as desired, and a top edge of the external formwork protruding substantially with respect to a top edge of the permanent formwork, so that in step (d) a space between the permanent formwork and the ground is filled up, as well as an area above the permanent formwork to form the rectangular prismatic module.

2. The procedure for manufacturing compact modules for construction, according to claim 1, wherein in step (a) permanent formwork materials which determine an internal permanent structure of the dwelling are used to form the permanent formwork.

3. The procedure for manufacturing compact modules for construction according to claim 1, wherein the permanent formwork incorporates, in correspondence with the openings for doors and windows, external partition walls having a thickness coinciding with a thickness of a wall of the concrete formed on the permanent formwork during step (d).

* * * * *